June 28, 1966 L. ROCKSTROM ETAL 3,258,136
REWIND ROLL HANDLING AND REWIND ROLL CORE LOADING APPARATUS
Filed Sept. 28, 1964 7 Sheets-Sheet 1

INVENTORS
LEONARD ROCKSTROM
ROBERT E. BUSH
BY
ATTORNEYS

June 28, 1966 L. ROCKSTROM ETAL 3,258,136
REWIND ROLL HANDLING AND REWIND ROLL CORE LOADING APPARATUS
Filed Sept. 28, 1964 7 Sheets-Sheet 4

INVENTORS
LEONARD ROCKSTROM
ROBERT E. BUSH
BY
ATTORNEYS

June 28, 1966 L. ROCKSTROM ETAL 3,258,136
REWIND ROLL HANDLING AND REWIND ROLL CORE LOADING APPARATUS
Filed Sept. 28, 1964 7 Sheets-Sheet 5

INVENTORS
LEONARD ROCKSTROM
ROBERT E. BUSH
BY
ATTORNEYS

June 28, 1966  L. ROCKSTROM ETAL  3,258,136
REWIND ROLL HANDLING AND REWIND ROLL CORE LOADING APPARATUS
Filed Sept. 28, 1964  7 Sheets-Sheet 6

Fig. 7.

INVENTORS
LEONARD ROCKSTROM
BY ROBERT E. BUSH
ATTORNEYS

United States Patent Office 3,258,136
Patented June 28, 1966

3,258,136
REWIND ROLL HANDLING AND REWIND ROLL CORE LOADING APPARATUS
Leonard Rockstrom, Madison, and Robert E. Bush, Morris Plains, N.J., assignors to Cameron Machine Company, Dover, N.J., a corporation of New York
Filed Sept. 28, 1964, Ser. No. 399,469
15 Claims. (Cl. 214—1)

This invention relates to rewind machines and more particularly to rewind roll handling and rewind core loading apparatus therefor. Heretofore, various apparatus and methods have been employed for removing a completed rewind roll from a rewind machine and inserting in place thereof a rewind roll core on which a new rewind roll is to be rewound. However, such apparatus and methods have not been entirely satisfactory.

An object of this invention is to provide an improved rewind roll handling and rewind roll core loading apparatus for a rewind machine which synchronizes the removal of a completed rewind roll and the insertion of a new rewind roll core in place thereof, which consistently removes a completed rewind roll without injuring or damaging the material rewound thereon, which is safe for the operating personnel, and which in the event of loss of fluid pressure prevents dropping of a completed rewind roll.

Another object of the invention is to provide an improved rewind roll handling and rewind roll core loading apparatus which may be easily employed with existing types of rewind machines, without greatly altering the present construction thereof, which is relatively simple, convenient, practical and inexpensive, which operates at a speed greatly in excess of prior art devices and thereby reduces the "down time" or non-operating time of the rewind machine and hence increases the production of the rewind machine.

In view of the foregoing, this invention contemplates the provision of a rewind roll handling and rewind roll core loading apparatus for a rewind machine comprising a frame, a conveyor table, conveyor means for selectively positioning the frame adjacent the rewind machine or adjacent the conveyor table. A pair of rewind roll unloading arms are mounted on the frame and are adapted to grip a completed rewind roll when the frame is in its position adjacent the rewind machine. The rewind roll unloading arms are also adapted to release the rewind roll when the frame is disposed in its position adjacent the conveyor table. A pivotal core loader is also mounted on the frame and is adapted for grasping a rewind roll core when the frame is in its position adjacent the conveyor table. The core loader is also adapted to release the rewind roll core when the frrme is positioned adjacent the rewind machine.

It will be appreciated that the apparatus constructed in accordance with the concept of this invention is adapted for use with any rewind machine in which the rewind roll is wound on a shaftless core between an individual pair of rewind arms, and hence it is substantially independent of the actual mode of winding of the web material. It will be further appreciated that a number of advantages are to be found with the use of a shaftless rewind roll core between an individual pair of rewind arms. Such advantages include the ability to utilize a rewind roll core of less demanding tolerances than practical with other types of rewind machines, the elimination of points of lubrication necessary with other types of rewind machines, the increase in the percentage of "running" time during the operational cycle, and the reduction in the percentage of rejected or scrap material found in ordinary production runs.

According to one embodiment of the invention the rewind roll handling and rewind roll core loading apparatus operates in conjunction with a rewind machine which comprises a pair of rewind arms, a rewind roll core chuck carried at the outer end of said arms, and pneumatic means including a cylinder and piston for pneumatically operating the chuck through a mechanical linkage. Further, one of the rewind arms carries at its outer end means for driving engagement with the chuck, which means being driven by motive means provided for the purpose.

In one embodiment of the present invention, the conveyor table comprises a pair of spaced apart endless means or conveyor belts extending substantially flush with the table top. The conveyor belts are adapted to receive the completed rewind rolls from the rewind roll unloading arms and carrying them to a second location for storage or additional processing, as desired. A retractable core positioner having core positioning pins is disposed in a slot between the belts. Thus, in operation empty rewind roll cores are carried by the retractable core positioners and accurately located by means of the core positioning pins so that the rewind roll core loader may readily grasp same. After the removal of the cores, the core positioner is retracted so that the completed rewind rolls may be placed on the conveyor belts and carried away.

Further in accordance with one embodiment of the present invention the frame comprises a series of structural elements and a hydraulic cylinder and piston means for controlling the vertical movement of the frame as well as the pivotal core loader and rewind roll unloading arms.

Also, in accordance with one embodiment of the invention, the conveyor means comprises an overhead track which runs substantially between the rewind machine and the conveyor table. The frame is suspended from the track and known means are employed to motivate the frame between a position super-adjacent the conveyor table and a position super-adjacent the rewind machine.

Still further in accordance with one embodiment of the invention, the rewind roll unloading means comprises a pair of arms mounted on the frame, each arm pivotally carrying a crank which is actuated by hydraulic means and counter-balanced by a compression spring and which, in turn, actuates a jaw member to selectively grasp and release a completed rewind roll.

Also, in accordance with one embodiment of the invention, the pivotal core loader comprises a pair of oppositely disposed core loader arms, and pneumatically controlled means for pivoting the core loader arm into and out of position for receiving and positioning a rewind roll core. The pivotal core loader further comprises a pair of clamps for grasping an empty core. Such clamping means are actuated and controlled by pneumatic means, counter-balanced by a tension spring.

There has thus been outlined rather broadly the more important features of the invention in order that the detail description thereof that follows may be better understood, and in order that the present contribution to the art may be better appreciated. There are, of course, additional features of the invention that will be described hereinafter and which will form the subject of the claims appended hereto. Thus, a person skilled in the art will appreciate that the conception on which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description and is shown in the accompanying drawings, forming a part of the specification, wherein:

FIG. 3 is an enlarged end elevation showing a pair of pivotal core loaders about to pick up rewind roll cores from the conveyor table;

Figure 1:
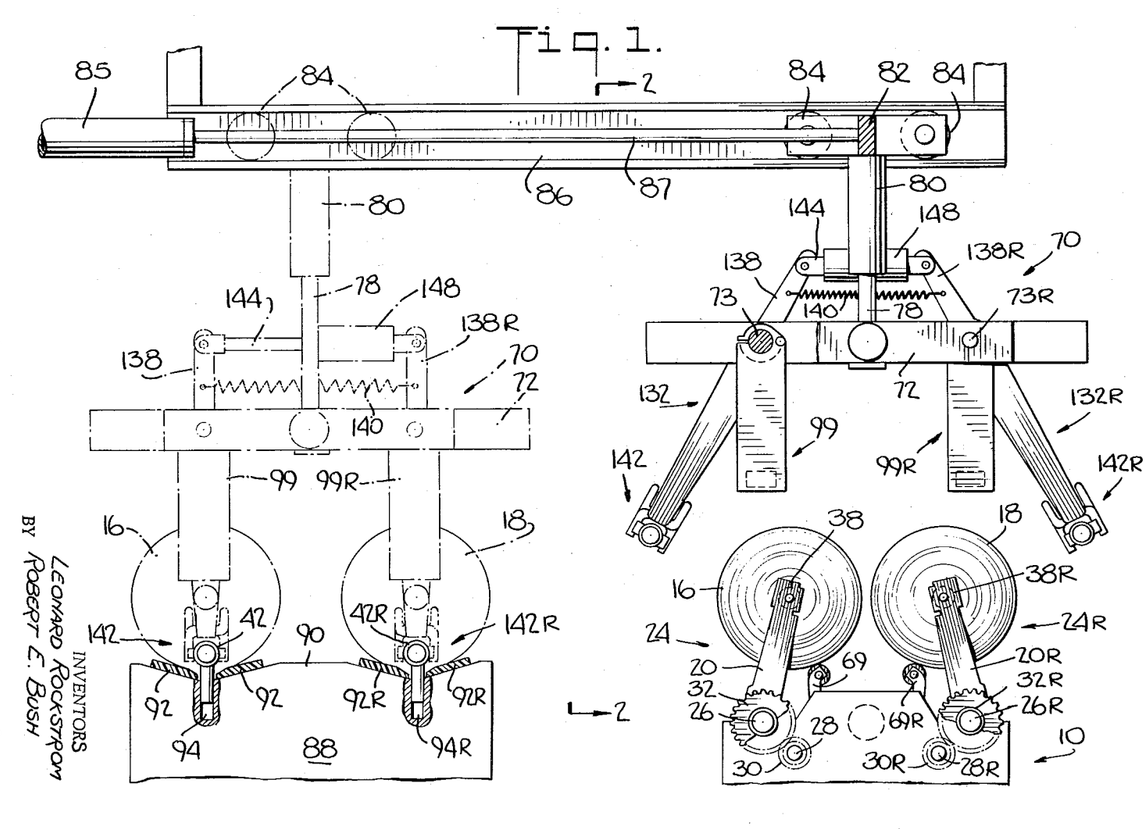
FIG. 1 is an end elevation showing rewind roll handling and rewind roll core loading apparatus constructed in accordance with the concept of this invention.

In the illustrated embodiment of the invention, the rewind roll handling and rewind roll core loading apparatus is shown in combination with a rewind machine designated generally at 10 in FIG. 1. By means well known in the art, a web of sheet material is received from a mill supply roll (not shown) and suitable means (not shown) are provided to cut the web into a plurality of elongated longitudinal strips or sub-webs. The sub-webs then pass partially around the main pull roll (not shown) and adjacent strips of webbing pass alternately around front rewind rolls 16 and rear rewind rolls 18. Preferably, there are a plurality of front rewind rolls designated as 16, 16a, 16b and 16c (FIG. 2) and a plurality of corresponding rear rewind rolls such as 18 (FIG. 1). It will be appreciated that the illustrated rewind machine is of the duplex type and comprises a front section and a rear section which are of similar construction and operate in a similar manner and, therefore, only the front section will be described in detail hereinafter, the front section being designated generally at 24 and the rear section being designated generally at 24R (FIG. 1). It is also noted that throughout the specification a suffix "R" has been added to various part numerical designations to denote a corresponding similar element in the rear section of or used in association with the rear section of the rewind machine.

Figure 2:
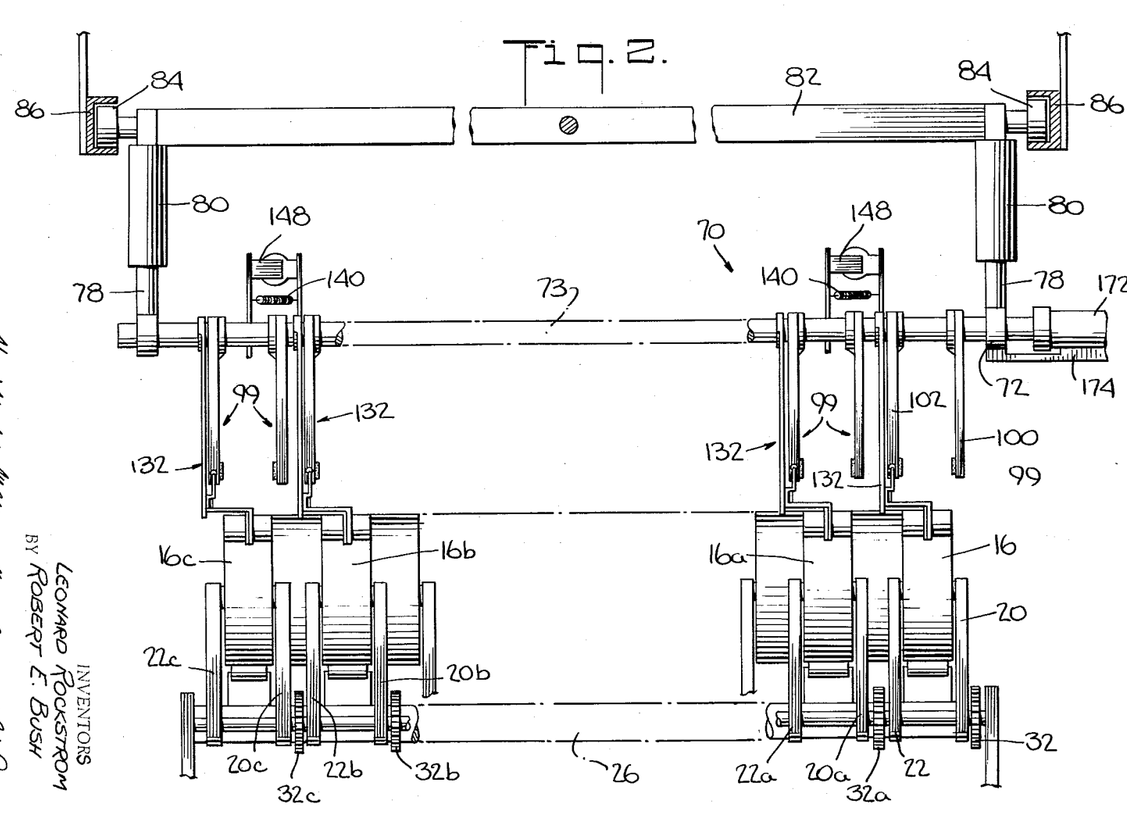
FIG. 2 is a sectional view taken along the line 2—2 of FIG. 1.

As best seen in FIG. 2, each rewind roll (16, 16a, 16b, 16c) is rotatably mounted on a pair of rewind arms 20 and 22, 20a and 22a, and 20b and 22b. The inner ends of the rewind arms 20, 22, 20a, 22a, 20b, 22b, 20c and 22c are carried on and secured to supporting shaft 26 which is pivotally mounted for selectively controlling the angle of inclination of the rewind arms as desired. It will be appreciated that the rewind arms may be longitudinally adjustably positioned along the rewind supporting shaft 26 to accommodate rewind rolls of various widths, as desired.

Figure 6:
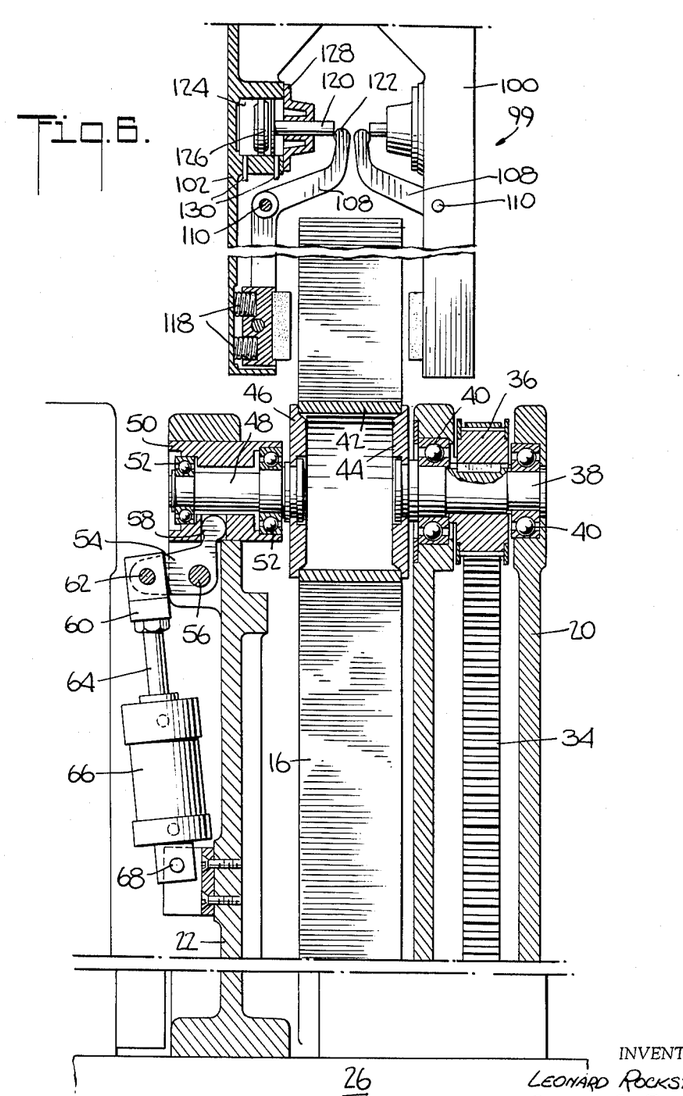
FIG. 6 is an enlarged side elevation, partially in section, of the rewind roll unloading means in its open condition and positioned adjacent a completed rewind roll which is clamped between a pair of rewind arms in a rewind machine.
Figure 7:
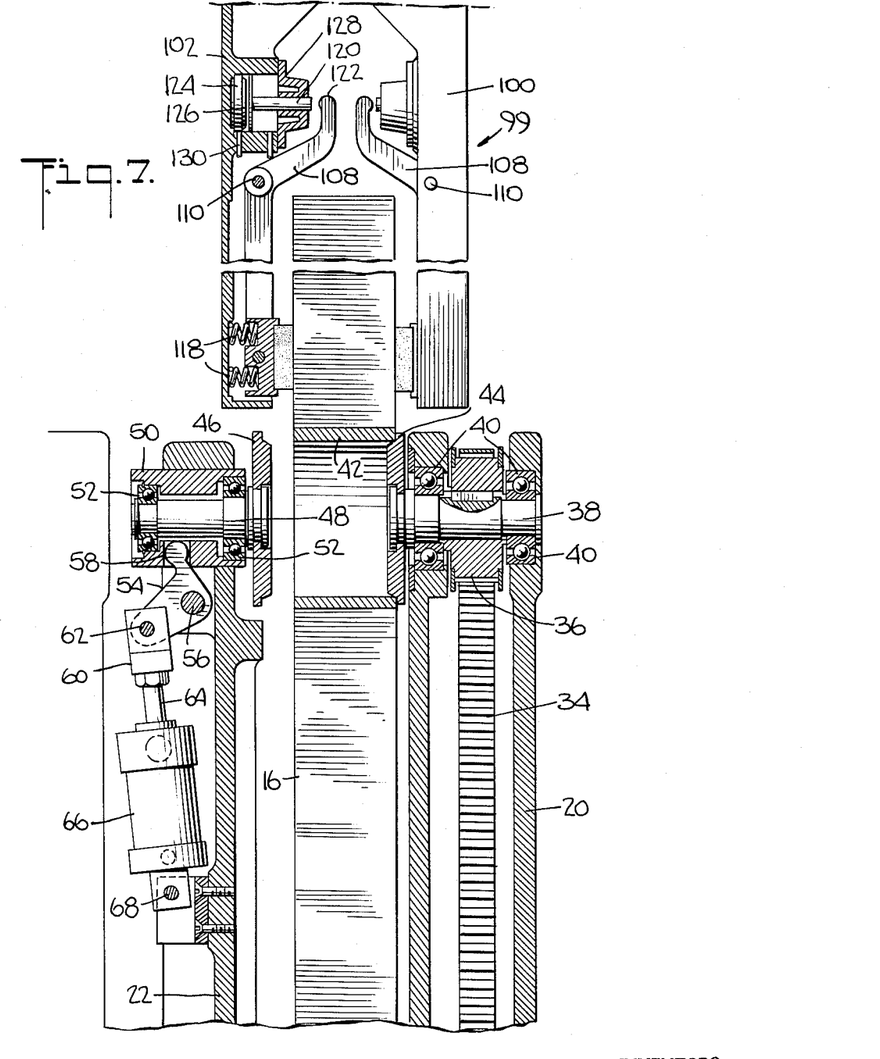
FIG. 7 is a view similar to FIG. 6 except that the rewind roll unloading means is in its closed position gripping a completed rewind roll which is shown between a pair of rewind arms of a rewind machine, the chuck being in its open position.

Referring to FIG. 1, in order to individually drive each rewind roll, main rewind roll drive shaft 28 is provided with a plurality of gears, only gears 30 and 30R being shown, each gear being disposed adjacent its respective rewind arm. Freely rotatably mounted on supporting shaft 26 are a plurality of gears 32, 32a, 32b and 32c (FIG. 2) which are driven by respectively cooperating gears such as 30. Gear 32 drives a tooth drive belt 34 (FIG. 6) through a clutch assembly (not shown). Belt 34 is in driving engagement with a driven tooth pulley 36 fixedly mounted on a core drive shaft 38 which in turn is rotatably mounted on the outer ends of rewind arm 20 as by means of bearings 40. A core 42 is carried at the outer end of the rewind arms 20 and 22 during the rewinding operation by means of chucks 44 and 46, chuck 44 being affixed to and driven by the core drive shaft 38, and chuck 46 being mounted on the end of a shaft 48 which is carried in a bearing housing 50 by means of bearings 52. Chuck 46 is adapted for axial movement for purposes of loading and unloading the core 42, FIG. 6 showing the chuck 46 in engagement with the core 42 in a rewinding position and FIG. 7 showing the chuck 46 removed from and out of engagement with the core 42 for purposes of removing the completed rewind roll 16. In order to axially move the chuck 46, a crank 54 is pivotally mounted on rewind arm 22 as by means of pin 56, one arm of which crank being adapted to engage bearing housing 50 as at 58 and the other end thereof being pivotally connected to a clevis 60 as by means of pin 62, clevis 60 being fixedly connected to a piston rod 64 extending from the end of a pneumatic cylinder 66. The other end of the pneumatic cylinder 66 is pivotally mounted on the rewind arm 22 as by means of pin 68. The axial movement of the chuck 46 is controlled by means (not shown) of regulating the air pressure in the pneumatic cylinder 66 in a known manner.

In order to provide positive control of the nip pressure for each rewind roll, tracking roll assemblies designated generally at 69 and 69R in FIG. 1 are provided. It will be appreciated that an individual tracking roll assembly is provided for each individual rewind roll including the front portion 24 and the rear portion 24R of the rewind machine. Hence, the nip force for each rewind roll may be individually controlled and maintained at the lowest possible value, as desired.

With reference to FIGS. 1 and 2, the frame is designated generally at 70 and comprises cross supporting members such as 72 and shaft members 73 and 73R. Hydraulic means are provided for selectively controlling the vertical movement of the frame and comprises piston rods such as 78 having the lower ends thereof fixedly connected to the cross supporting members such as 72 and the other ends thereof extending into hydraulic cylinders such as 80. The other ends of the hydraulic cylinders 80 are fixedly connected to the cross members such as 82. The extremities of cross members 82 are each provided with a pair of wheels 84 which are adapted to travel in a pair of spaced overhead tracks 86. As best seen in FIG. 1, the spaced overhead tracks 86 form a conveyor means which is adapted to carry the frame 70 between a first position super-adjacent the rewind machine (illustrated by the solid lines in FIG. 1), and a second position super-adjacent the conveyor table (illustrated by the broken lines in FIG. 1), the conveyor table being designated generally at 88. Motive means for selectively moving the frame 70 are provided by a hydraulic cylinder 85 having a piston 87 which is fixedly secured to the cross member 82 as seen in FIG. 1. Fluid is selectively supplied to the cylinder 85 in a known manner (not shown).

Referring to FIG. 3, the upper surface 90 of the conveyor table 88 is provided with two pairs of endless means or conveyor belts 92 and 92R. The conveyor belts are adapted to receive the completed rewind roll and carry same to a remote position (not shown) for purposes of storage, shipment or additional processing. Interposed between the two belts of each pair are vertical recesses 94 and 94R which are adapted to receive retractable core positioners such as 96 and 96R (FIG. 3). The upper surface of the retractable core positioners 96 and 96R are provided with projecting core positioning pins such as 98 and 98R, a pin being provided for each rewind roll core.

The core positioners 96 and 96R are adapted for vertical movement by suitable means (not shown) for a purpose which will be described more fully hereinafter.

Figures 8, 9:
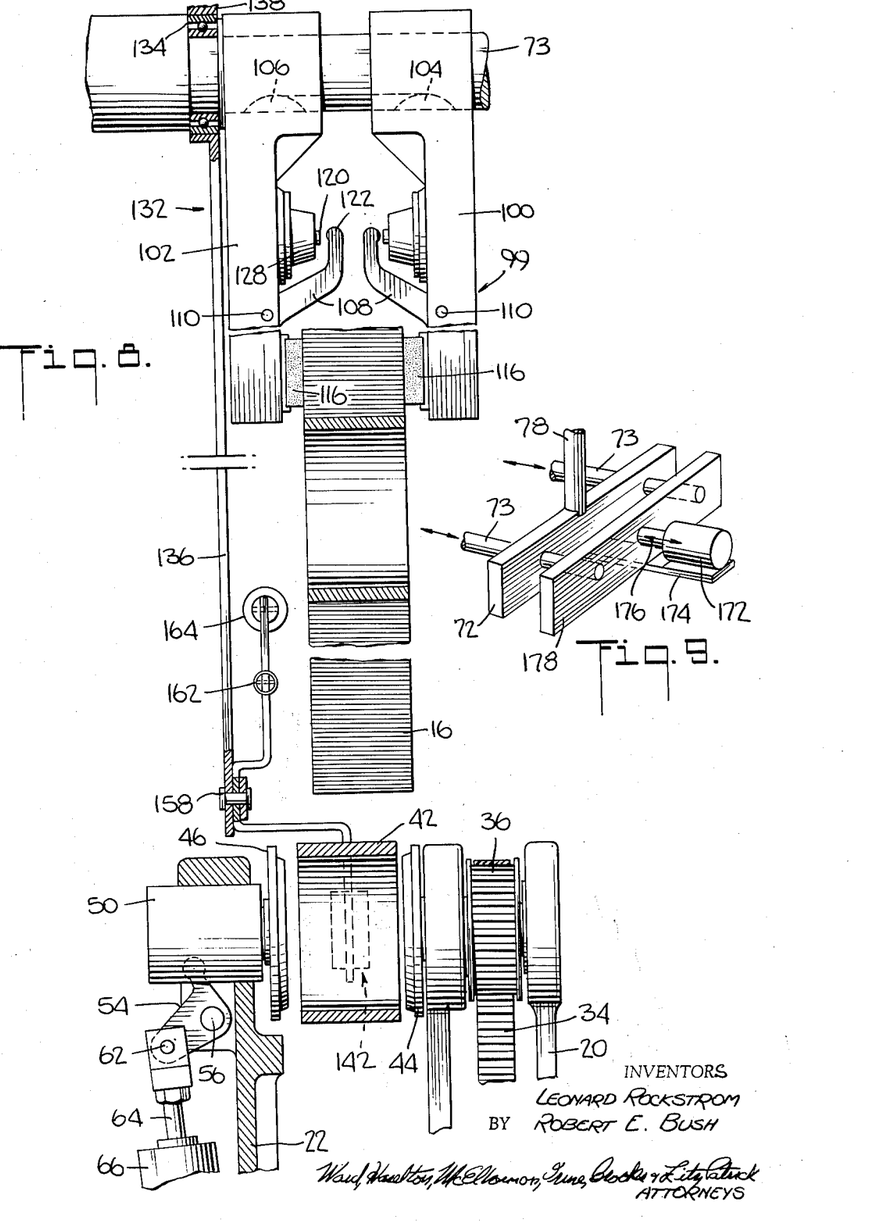
FIG. 8 is a side elevation showing the rewind roll unloading means gripping a completed rewind roll and the core loader positioning a core between a pair of rewind arms.
FIG. 9 is an enlarged perspective view showing the details of construction of the means for longitudinally moving the frame member.

As best seen in FIG. 8 the rewind roll unloading means designated generally at 99 comprises a pair of rewind roll unloading arms 100 and 102 which are fixedly keyed to shaft member 73 as by means of keys 104 and 106, respectively. It will be appreciated that the illustrated rewind roll unloading means 99 comprises a right hand side and a left hand side as viewed in FIGS. 6 and 7, which sides being of similar construction and operate in a similar manner and, therefore, only the left hand side will be described in detail hereinafter. Rewind roll unloading arm 102 supports a corresponding crank 108 which pivots about pin 110. The lower arm of the crank 108 is pivotally connected by pin 111 (FIGS. 6 and 7) to a jaw 112 of a pair of jaws, each jaw having a pad 116 so that the rewind roll such as 16 will not be damaged when the jaws are in their closed position (FIG. 7). The rewind roll unloading arm 102 contains a recess for receiving compression springs 118 which tend to close the jaw 112. The other arm of the crank 108 is adapted to engage the end of a piston rod 120 as at 122. The rewind roll unloading arm 102 is provided with a cylindrical recess or chamber 124 which acts as a pneumatic or hydraulic cylinder for piston 126 fixedly connected to the end of the piston rod 120, bushing 128 acting as a closure for the chamber. Openings 130 (FIG. 6) are provided in the chamber 124 for the flow of air or hydraulic fluid. Hence, it is seen that by controlling the fluid pressure acting on the piston 126, the piston rod 122 engages the arm of the crank 108 at 122 and, thereby, pivots the jaw 112 to its open position by counterbalancing the force of the compression springs 118.

FIG. 6 illustrates the jaws in their open position as would occur during the rewinding operation and FIG. 7 illustrates the jaws in their closed position as would occur when the completed rewind roll 16 is being lifted from the rewind machine. It will be appreciated that the forementioned construction provides a "fail safe" clamping means for the removal and handling of a completed rewind roll. That is, in the event of hydraulic or pneumatic fluid failure the force of the compression springs 118 will automatically maintain the jaw 112 in its closed position and, hence, the completed rewind roll 16 cannot be dropped.

Figure 4:
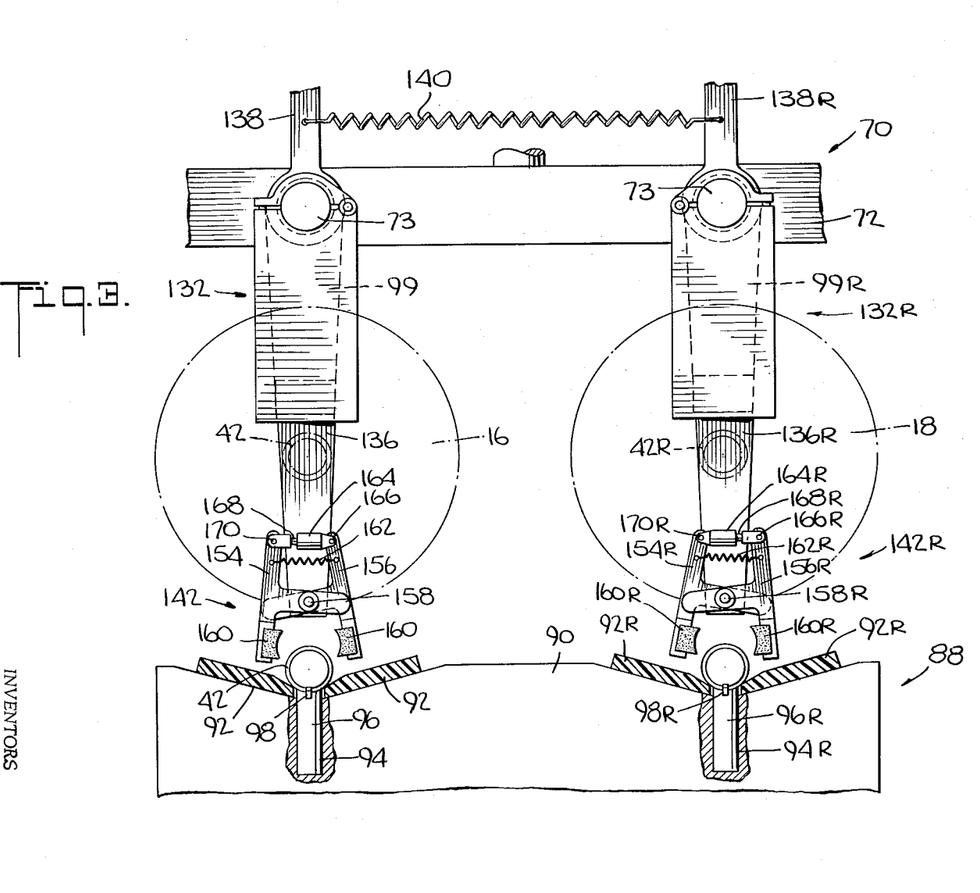
FIG. 4 is an end elevation similar to FIG. 3, except drawn to a smaller scale and showing the pivotal core loaders mounted on the frame and grasping a pair of rewind roll cores positioned on the conveyor table.
Figure 5:
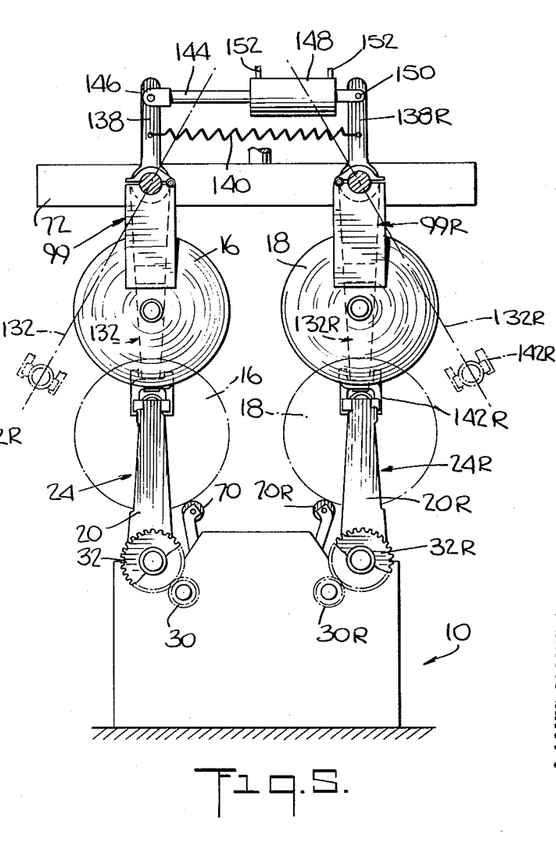
FIG. 5 is an end elevation drawn to the same scale as FIG. 4, and showing a pair of pivotal core loaders positioning rewind roll cores on the rewind arms of the rewind machine.

Referring to FIG. 8, the core loader assemblies are each designated generally as 132 and are pivotally mounted on a shaft member such as 73 as by means of bearing 134. As best seen in FIG. 4, each core loader assembly such as 132 is provided with a core loader lower arm 136 and a core loader upper arm 138. It will be appreciated that cooperating core loader assemblies are provided one being associated with the front of the rewind machine 24 and the other being associated with the rear of the rewind machine 24R. When describing the core loader means only the front core loader assembly 132 will be described in detail and the corresponding elements of the rear assembly 132R which are constructed and operate in a like manner will be designated with a suffix R. Referring to FIGS. 4 and 5, the core loader upper arms 138 and 138R are connected one to the other by means of a tension spring 140 which tends to bring the top of the upper arms toward each other and thereby separating the lower ends carrying respective core loader clamping means 142 and 142R as shown by the broken center lines in FIGS. 4 and 5. A piston rod 144 is pivotally connected to the core upper arm 138 as by means of pin 146. A pneumatic cylinder 148 is pivotally connected at one end thereof to the core loader crank 138R as by means of pin 150, piston rod 144 extending from the other end thereof. Air is supplied to the pneumatic cylinder 148 through the connections 152 provided for the purpose of actuating the piston rod 144 and thereby positioning the core loader clamping means 142 and 142R.

It will be appreciated that in lieu of the tension spring 140, pneumatic cylinder 148 may be regulated through a four-way valve and hence the movement of the core loader clamping means 142 and 142R may thereby be controlled for movement in either direction.

As best seen in FIG. 3 the clamping means 142 comprises a pair of scissor-like clamps 154 and 156 which are pivotally mounted on the lower end of the core loader arm 136 as by means of pin 158. The core loader clamps 154 and 156 are provided with clamp pads 160 for purposes of protecting the core 42. A tension spring 162 interconnects the upper ends of the clamps 154 and 156, respectively. Further, one end of a pneumatic cylinder 164 is pivotally connected to clamp 156 as by means of pin 166 and the other end thereof is provided with a piston rod 168 extending therefrom, such piston rod being pivotally connected to clamp 154 as by means of pin 170. The clamping motion of the clamps 154 and 156 is controlled by means (not shown) of regulating the air pressure in the pneumatic cylinder 164 in a known manner.

In operation, the frame 70 (FIG. 1), is moved along the tracks 86 to a position super-adjacent the conveyor table 88 (shown by the broken lines in FIG. 1). The core loader assemblies 132 and 132R are then rotated to their vertical positions as illustrated by the solid lines in FIG. 4 by means of controlling the air pressure in the pneumatic cylinder 148. Thence, the frame 70 is lowered by means of hydraulic cylinders 80 until the rewind core clamping means 142 and 142R are in position to grasp an empty core 42. As best seen in FIG. 1, the frame by means of hydraulic cylinder 80 is thence elevated and moved along the track 86 by means of hydraulic cylinder 85 and piston 87 to a position super-adajacent the rewind machine 10. Then the core loader assemblies 132 and 132R are pivoted outwardly away from their vertical position by means of actuating the pneumatic cylinder 148, this position being illustrated by the broken lines in FIG. 5. The rewind roll unloading arms are thence lowered into position by means of the hydraulic cylinders 80 of the frame (FIG. 1) and the jaws 112 of the rewind roll unloading arms 100 and 102 are opened to the position as illustrated in FIG. 6, fluid pressure being exerted against the piston 126 in order to maintain the jaws 112 in this position. Then the jaws 112 are closed by means of releasing the pressure in the chamber 124 so that the force of the compression springs 118 closes the jaws 112, thereby clamping the completed rewind roll 16 as shown in FIG. 7. Thence the pneumatic cylinder 66 is actuated for purposes of opening the chucks 44 and 46 from their position illustrated in FIG. 6 to their position illustrated in FIG. 7. It is noted that the core 42 as viewed in FIG. 7 is retained on the lip of the chuck 44 even after the chuck 46 has been moved outwardly. In order to lift the completed rewind roll 16 upwardly it must first be moved to the left as viewed in FIGS. 7 and 2. This is done by means of moving the frame 70 to the left as viewed in FIG. 2 by a hydraulic cylinder 172 mounted on a support 174 which is fixedly attached to the cross supporting member 72. As best seen in FIG. 9, a piston rod 176 extends from the cylinder 172 and is fixedly attached to cross member 178. The shaft members 73 are also fixedly attached to the cross member 178. Thus it is seen that the cross supporting member 72, piston rod 78, support 174 and cylinder 172 remain stationary with respect to the moving members which include the piston rod 176, cross member 178 and shaft members 73. Fluid is selectively supplied to the cylinder 172 by suitable means (not shown). The frame 70 is then lifted vertically by means of the hydraulic cylinder 80 (FIG. 1) to remove the completed rewind roll from the rewind machine. As best seen in FIG. 5, after the completed rewind rolls 16 and 18 have been lifted from their position as indicated by the broken lines in FIG. 5 to the position as indicated by the solid lines in FIG. 5, the core loader assemblies 132 and 132R are pivoted from their positions as shown by the broken center lines to their vertical positions as shown by the solid lines of the assemblies 132 and 132R in FIG. 7. The then position of the empty rewind roll core 42 is shown in FIG. 8. Thence chucks 44 and 46 are moved to their closed positions by means of the pneumatic cylinder 66, thereby holding the core in position for the winding thereon of a web of sheet material to form a new rewind roll. Clamps 154 and 156 (FIG. 2) of the core loader are then moved to their open position by means of actuating the pneumatic cylinder 164 so that the spring member 162 is greater than the force of the pneumatic system. Referring to FIG. 1, the frame member 70 is again elevated slightly by means of the hydraulic cylinders 80 and thence moved to its position super-adajacent the conveyor table 88. As best seen in FIG. 3, while the core loader arm 136 and 136R are in their vertical position the frame is moved downwardly so that the clamping members 154 and 156 may grasp an empty set of rewind cores which have been manually positioned upon the core positioning pins 98 of the retractable core positioner 96, the latter being in its upward position at this time. After the core loader assemblies 132 and 132R have grasped the new cores 42, the core loaders are swung outwardly as shown by the broken lines in FIG. 4 and the frame member is again lowered until the completed rewind rolls are placed upon the conveyor belts 92 also shown by the broken lines in FIG. 4. The jaws 112 and 114 (FIG. 6) of the rewind roll unloading means are opened by means of increasing the air pressure in the chamber 124 in order to overcome the force of the compression spring 118 and thereby release the completed rewind rolls 16. The completed rewind rolls are carried to a subsequent operation or to a storage location (not shown) by means of the conveyor belts 92, and the rewind roll handling and rewind roll core loading apparatus is ready for starting the next cycle of operation.

It will be understood that various changes in the details, materials and arrangements of parts which have been herein described and illustrated in order to explain the nature of the invention, may be made by those skilled in the art within the principle and scope of the invention, and expressed in the appended claims.

We claim:

1. A rewind roll handling and core loading apparatus for a rewind machine having means for supporting a rewind roll core which is adapted for the winding thereon of web material in the form of a rewind roll, said apparatus comprising a frame, means for selectively vertically positioning said frame, a conveyor table, means for moving said frame between a first position adjacent said rewind machine and a second position adjacent said conveyor table, rewind roll unloading means mounted on said frame for grasping and removing a completed rewind roll when said frame is in its first position and for depositing said completed rewind roll upon said conveyor table when said frame is in its second position, a pivotal core loader assembly mounted on said frame adjacent said rewind roll unloading means for receiving a rewind roll core from said conveyor table and placing said core on the rewind arms of the rewind machine subsequent to the removal of the completed rewind roll by the rewind roll unloading means.

2. A rewind roll handling and core loading apparatus for a rewind machine having means for supporting a plurality of rewind roll cores which are adapted for the winding thereon of web material in the form of rewind rolls respectively, said apparatus comprising a frame, means for vertically positioning said frame, a conveyor table, means for moving said frame between a first position adjacent said rewind machine and a second position adjacent said conveyor table, a plurality of pairs of rewind roll unloading arms for grasping and removing completed rewind rolls from said rewind machine when said frame is in its first position and for placing said completed rewind rolls upon said conveyor table when said frame is in its second position, a like plurality of core loader assemblies each being pivotally mounted on said frame adjacent a pair of rewind roll unloading arms for receiving rewind roll cores from said conveyor table and placing said cores in the rewind machine subsequent to the removal of the completed rewind rolls respectively.

3. A rewind roll handling and core loading apparatus for a rewind machine having means for supporting a plurality of rewind roll cores which are adapted for the winding thereon of web material in the form of rewind rolls respectively, said apparatus comprising a frame, means for vertically positioning said frame to lift completed rewind rolls upwardly from said rewind machine, means for transversely, horizontally moving said frame for removing said completed rewind rolls from said means for supporting a plurality of rewind roll cores, a conveyor table, means for moving said frame between a first position adjacent said rewind machine and a second position adjacent said conveyor table, a plurality of pairs of rewind roll unloading arms for grasping and removing completed rewind rolls from said rewind machine when said frame is in its first position and for placing said completed rewind rolls upon said conveyor table when said frame is in its second position, a like plurality of core loader assemblies each being pivotally mounted on said frame adjacent a pair of rewind roll unloading arms for receiving rewind roll cores from said conveyor table and placing said cores in the rewind machine subsequent to the removal of the completed rewind rolls respectively.

4. A rewind roll handling and rewind roll core loading apparatus for a rewind machine having means for supporting a rewind roll core which is adapted for the winding thereon of web material in the form of a rewind roll, said apparatus comprising a frame having carrying members projecting therefrom, means for selectively vertically positioning said frame, a conveyor table, means for moving said frame between a first position adjacent said rewind machine and a second position adjacent said conveyor table, said last named means comprising track means for guiding said carrying members projecting from the frame, rewind roll unloading means mounted on said frame picking up a completed rewind roll when said frame is in its first position and for depositing said completed rewind roll upon said conveyor table when said frame is in its second position, a core loader pivotally mounted on said frame adjacent said rewind roll unloading means for removing a rewind roll core from the conveyor table and positioning said core in the rewind machine subsequent to the removal of the completed rewind roll by the rewind roll unloading means.

5. A rewind roll handling and rewind roll core loading apparatus for a rewind machine having a plurality of pairs of rewind arms for supporting rewind roll cores which are adapted for the winding thereon of web material in the form of rewind rolls respectively, said apparatus comprising a frame having at least one wheel depending from the upper portion thereof, at least one vertically acting fluid piston for selectively positioning said frame, means for moving said frame between a first position adjacent said rewind machine and a second position, said last named means comprising at least one overhead track for guiding and supporting the wheel of said frame, a plurality of pairs of rewind roll unloading arms for grasping and removing completed rewind rolls from said rewind arms respectively when said frame is in its first position and for releasing said completed rewind rolls when said frame is in its second position, a like plurality of core loader assemblies each being pivotally mounted on said frame adjacent a pair of rewind roll unloading arms for receiving rewind roll cores when said frame is in its second position and placing said cores in the rewind machine subsequent to the removal of the completed rewind rolls respectively.

6. A rewind roll handling and rewind roll core loading apparatus for a rewind machine having a pair of rewind arms for supporting a rewind roll core which is adapted for the winding thereon of web material in the form of a rewind roll, said apparatus comprising a frame, means for selectively vertically positioning said frame, a conveyor table having a pair of endless means disposed adjacent the upper surface thereof, retractable core positioning means disposed between said pair of endless means, means for moving said frame between a first position adjacent said rewind machine and a second position adjacent said conveyor table, rewind roll unloading means mounted on said frame for grasping and removing a completed rewind roll when said frame is in its first position and for depositing said completed rewind roll on said conveyor belts when said frame is in its second position, a pivotal core loader assembly mounted on said frame adjacent said rewind roll unloading arms, said loader assembly being adapted for grasping a rewind roll core when said core is positioned on said retractable core positioner disposed between said conveyor belts, and said core loader assembly being further adapted to position said core between said rewind arms of the rewind machine subsequent to the removal of the completed rewind roll by the rewind roll unloading means.

7. A rewind roll handling and rewind roll core loading apparatus for a duplex rewind machine having a plurality of pairs of rewind arms in each of two rows for supporting rewind roll cores which are adapted for the winding thereon of web material in the form of rewind rolls respectively, said apparatus comprising a frame, means for selectively vertically positioning said frame, a conveyor table having two spaced pairs of conveyor belts disposed at oblique angles and adjacent the upper surface thereof, a retractable core positioner having a plurality of core positioning pins being disposed between each pair of conveyor belts, means for moving said frame between a first position adjacent said rewind machine and a second position adjacent said conveyor table, a plurality of pairs of rewind roll unloading arms mounted on said frame in two rows for grasping and removing completely rewind rolls when said frame is in its first position and for depositing said completed rewind rolls on said conveyor belts respectively when said frame is in its second position, a pivotal core loader assembly mounted on said frame adjacent each of said pairs of rewind roll unloading arms, said loader assembly being adapted for picking up rewind roll cores when said cores are positioned on said core positioning pins, and said core loader assembly being further adapted to position said cores between said rewind arms respectively of the rewind machine subsequent to the removal of the completed rewind rolls by the rewind roll unloading means respectively.

8. A rewind roll handling and rewind roll core loading apparatus for a rewind machine having a pair of rewind arms for supporting a rewind roll core which is adapted for the winding thereon of web material in the form of a rewind roll, said apparatus comprising a frame, means for selectively vertically positioning said frame, a conveyor table, means for moving said frame member between a first position adjacent said rewind machine and a second position adjacent said conveyor table, a pair of rewind roll unloading arms mounted on said frame member, a pair of cranks pivotally mounted on said unloading arms respectively, each of said cranks carrying a jaw at one end thereof, resilient means tending to pivot said cranks toward their closed position, fluid piston means tending to pivot said cranks toward their open position, said jaws being adapted to grasp and lift a completed rewind roll when said frame is in its first position and for releasing said roll upon said conveyor table when said frame is in its second position, a pivotal core loader mounted on said frame adjacent said rewind roll unloading arms for removing a rewind roll core from said conveyor table and positioning said core on the rewind arms of the rewind machine subsequent to the removal of the completed rewind roll by the rewind roll unloading arms.

9. A rewind roll handling and rewind roll core loading apparatus for a duplex rewind machine having a plurality of pairs of rewind arms in each of two rows for supporting rewind roll cores which are adapted for the winding thereon of web material in the form of rewind rolls respectively, said apparatus comprising a frame member, means for selectively vertically positioning said frame member, a conveyor table, means for moving said frame member between a first position adjacent said rewind machine and a second position adjacent said conveyor table, a plurality of pairs of rewind roll unloading arms mounted on said frame member in substantially two rows, a like plurality of pairs of cranks pivotally mounted on said unloading arms respectively, a like plurality of pairs of jaws pivotally mounted on said cranks respectively, a plurality of compression springs tending to pivot said crank arms and close said jaws respectively, a plurality of hydraulic cylinders and pistons adapted to pivot said crank arms respectively in the opposite direction and thereby oppose said compression spring forces, whereby said jaws are adapted to grasp and remove completed rewind rolls when said frame member is in its first position and setting down said rolls upon said conveyor table when said frame member is in its second position, a like plurality of pivotal core loaders mounted on said frame member adjacent said rewind roll unloading arms for removing rewind roll cores from said conveyor table and positioning said cores on the rewind arms of the rewind machine subsequent to the removal of the completed rewind rolls by the rewind roll unloading arms respectively.

10. A rewind roll handling and rewind roll core loading apparatus for a rewind machine having a pair of rewind arms for supporting a rewind roll core which is adapted for the winding thereon of web material in the form of a rewind roll, said apparatus comprising a frame, means for selectively vertically positioning said frame, a conveyor table, means for moving said frame between a first position adjacent said rewind machine and a second position adjacent said conveyor table, rewind roll unloading means mounted on said frame for grasping and removing a completed rewind roll when said frame is in its first position and for setting down said completed rewind roll upon said conveyor table when said frame is in its second position, a core loader arm, means for pivoting said core loader arm, a pair of scissor-like clamp members pivotally mounted on the extremity of said core loader arm, fluid piston means for actuating said clamp members for grasping and lifting an empty rewind roll core when said frame is in its second position and for positioning said rewind core between said rewind arms of the rewind machine when said frame is in its first position.

11. A rewind roll core loading apparatus for a rewind machine having a pair of rewind arms for supporting a rewind roll core which is adapted for the winding thereon of web material in the form of a rewind roll, said apparatus comprising a frame, means for selectively vertically positioning said frame, a conveyor table, means for moving said frame between a first position adjacent said rewind machine and a second position adjacent said conveyor table, a core loader arm, means for pivoting said core loader arm between a first vertical position and a second non-vertical position, a pair of scissor-like clamp members pivotally mounted on one end of said core loader arm, resilient means tending to open said clamp members, fluid piston means for closing said clamp members for grasping and lifting an empty rewind roll core when said frame is in its second position and said core loader arm is in its first position and for positioning said rewind core between said rewind arms of the rewind machine when said frame is in its first position and said core loader arm is in its first position.

12. Apparatus for a rewind machine according to claim 11 wherein said apparatus further comprises a pair of rewind roll unloading arms mounted on said frame substantially adjacent said core loader arm for grasping and removing a completed rewind roll when said frame is in its first position and said core loader arm is in its second position and for setting down said completed rewind roll upon said conveyor table when said frame is in its second position and said core loader arm is in its second position.

13. A rewind roll core loading apparatus for a duplex rewind machine having a plurality of pairs of rewind arms in each of two rows for supporting rewind roll cores which are adapted for the winding thereon of web material in the form of rewind rolls respectively, said apparatus comprising a frame, means for selectively vertically positioning said frame, a conveyor table, means for moving said frame between a first position adjacent said rewind machine and a second position adjacent said conveyor table, a plurality of pairs of core loader arms, a shaft member pivotally supporting one arm of each pair and a second shaft member pivotally supporting the other arm of each pair, resilient means and fluid piston means cooperating to pivot said core loader arms between a first vertical position and a second non-vertical position, a pair of scissor-like clamp members pivotally mounted on one end of each core loader arm, resilient means and fluid piston means cooperating to actuate each pair of clamp members for grasping and lifting an empty rewind roll core when said frame is in its second position and said core loader arms are in their first position and for positioning said rewind core btween its corresponding rewind arms of the rewind machine when said frame is in its first position and said core loader arms are in their first position.

14. Apparatus for a rewind machine according to claim 13 wherein said apparatus further comprises a like plurality of pairs of rewind roll unloading arms mounted on said frame substantially adjacent said core loader arms respectively, a like plurality of pairs of cranks pivotally mounted on said unloading arms respectively, a like plurality of pairs of jaws pivotally mounted on said cranks respectively, resilient means and fluid piston means cooperating to actuate said jaws for grasping and removing completed rewind rolls respectively when said frame is in its first position and said core loader arms are in their second positions and for setting down said rolls upon said conveyor table when said frame is in its second position and said core loader arms are in their second positions.

15. A rewind roll handling and rewind roll core loading apparatus for a rewind machine having a plurality of pairs of rewind arms for supporting rewind roll cores which are adapted for the winding thereon of web material in the form of rewind rolls respectively, said apparatus comprising a frame having at least one wheel depending from the upper portion thereof, at least one vertically acting fluid piston for selectively positioning said frame, a fluid piston for transversely, horizontally, selectively positioning said frame, a conveyor table having two spaced pairs of conveyor belts disposed at oblique angles thereto and adjacent the upper surface thereof, a retractable core positioner having a plurality of core positioning pins being disposed between each pair of conveyor belts, fluid piston means for moving said frame between a first position adjacent said rewind machine and a second position adjacent said conveyor table, said last named means comprising at least one overhead track for guiding and supporting the wheel of said frame, a plurality of pairs of core loader arms, a shaft member pivotally supporting one arm of each pair and a second shaft member pivotally supporting the other arm of each pair, resilient means and fluid piston means cooperating to pivot said core loader arms between a first vertical position and a second non-vertical position, a pair of scissor-like clamp members pivotally mounted on one end of each core loader arm, resilient means and fluid piston means cooperating to actuate each pair of clamp members for grasping and lifting an empty rewind roll core when said frame is in its second position and said core loader arms are in their first positions and for positioning said rewind core between the corresponding rewind arms of the rewind machine when said frame is in its first position and said core loader arms are in their first positions, a like plurality of pairs of rewind roll unloading arms mounted on said frame substantially adjacent said core loader arms respectively, a like plurality of pairs of cranks pivotally mounted on said unloading arms respectively, a like plurality of pairs of jaws pivotally mounted on said cranks respectively, resilient means and fluid piston means cooperating to actuate said jaws for grasping and removing completed rewind rolls respectively when said frame is in its first position and said core loader arms are in their second position and for setting down said rolls upon said conveyor table when said frame is in its second position and said core loader arms are in their second positions.

References Cited by the Examiner
UNITED STATES PATENTS

| | | | |
|---|---|---|---|
| 2,501,985 | 3/1950 | Benjamin | 242—58.6 |
| 2,813,380 | 11/1957 | Narel. | |
| 2,927,703 | 3/1960 | Rainey. | |
| 3,209,923 | 10/1965 | Bargel. | |

MARVIN A. CHAMPION, *Primary Examiner.*